United States Patent [19]
Krenzler

[11] Patent Number: 5,807,023
[45] Date of Patent: Sep. 15, 1998

[54] ARTIFICIAL REEF WITH CORRODIBLE IRON INSERTS

[76] Inventor: Leo M. Krenzler, 19550 Pacific Hwy. S., No. 202, Seattle, Wash. 98188

[21] Appl. No.: 822,417

[22] Filed: Mar. 21, 1997

[51] Int. Cl.$^6$ .................................................. A01K 61/00
[52] U.S. Cl. .............................. 405/21; 405/25; 405/28; 119/222
[58] Field of Search ................................ 405/21–28, 30; 119/200, 221, 222

[56] References Cited

U.S. PATENT DOCUMENTS

| | | | |
|---|---|---|---|
| 1,747,804 | 2/1930 | Travers et al. | 119/268 |
| 3,928,701 | 12/1975 | Roehner | 428/222 |
| 4,095,560 | 6/1978 | Laurie et al. | 119/222 |
| 4,196,694 | 4/1980 | Buchanan | 119/222 |
| 4,205,625 | 6/1980 | Muller-Feuga | 119/221 |
| 4,324,067 | 4/1982 | Kessler | 47/1.4 |
| 4,333,263 | 6/1982 | Adey | 47/1.4 |
| 4,334,499 | 6/1982 | Baass | 119/222 |
| 4,352,591 | 10/1982 | Thompson | 405/87 |
| 4,554,390 | 11/1985 | Curtain et al. | 568/870 |
| 4,699,086 | 10/1987 | Mori | 119/51.04 |
| 4,992,207 | 2/1991 | Darnall et al. | 252/315.6 |
| 5,011,604 | 4/1991 | Wilde et al. | 210/602 |
| 5,121,708 | 6/1992 | Nuttle | 119/3 |
| 5,213,058 | 5/1993 | Parker et al. | 119/2 |
| 5,215,406 | 6/1993 | Hudson | 405/25 |
| 5,238,325 | 8/1993 | Krenzler | 405/21 |
| 5,254,252 | 10/1993 | Drenner | 210/602 |
| 5,370,476 | 12/1994 | Streichenberger | 405/25 |
| 5,564,369 | 10/1996 | Barber et al. | 119/221 |

OTHER PUBLICATIONS

"Solving the Secret of the Ocean's 'Dead Zones'", Science Web, Oct. 1996.

Pearce, Fred, "Extra Iron Makes Blue Deserts Bloom", New Scientist, vol. 152, issue 2051, Oct. 1996.

Article entitled: "Fertilize the ocean, restore fisheries with iron filings," by Dennis T. Avery. Published in the Thursday, Mar. 27, 1997 edition of The Seattle Times.

Richard Monastersky, "Iron Versus the Greenhouse Oceanographers Cautiously Explore a Global Warming Therapy, "Science News, vol. 148, p. 220, Sep. 30, 1995.

"Scientists Say Iron Particles Cut World Heat," Columbia University Record, vol. 21, No. 6, Feb. 9, 1996.

"Experiment Fertilizes Ocean with Iron," Seattle Daily Journal of Commerce, Oct. 8, 1996.

"Iron 'Fertilization' Causes Plankton Bloom; Scientists Link Iron to Climate Change," mlane@nsf.gov, Oct. 10, 1996.

*Primary Examiner*—David J. Bagnell
*Assistant Examiner*—Tara L. Mayo
*Attorney, Agent, or Firm*—Kathleen T. Petrich

[57] ABSTRACT

An artificial reef (10) that can provide a safehaven for small aquatic life and promotes phytoplankton growth (37), of which phytoplankton is food for the small aquatic life. The reef (10) includes at least one tubular vehicle tire (12) having a wall (14) that defines an exterior (16) and a hollow interior (18). The wall (14) includes oppositely situated sidewalls (20) that are interconnected by a treadwall (22) to provide a substantially U-shaped radial cross-section (23). At least one elongated corrodible iron insert (24) is inserted through each wall (14). Each insert (24) has a first end (26), a second end (28) and a center (30). The first end extends into the hollow interior (18), the center (30) is securely positioned through wall (14) between the exterior (16) and the interior (18), and the second end extends externally of the exterior (16). The insert (24) is preferably a nail, but may be a staple or other shape. The inserts (24) may have varying iron contents to control the insert corrosion rates In use, the inserts corrode to promote rapid phytoplankton growth. Additionally, the phytoplankton consumes carbon dioxide during the rapid growth. The hollow interior provides a safehaven for the aquatic life who feed on the phytoplankton.

24 Claims, 6 Drawing Sheets

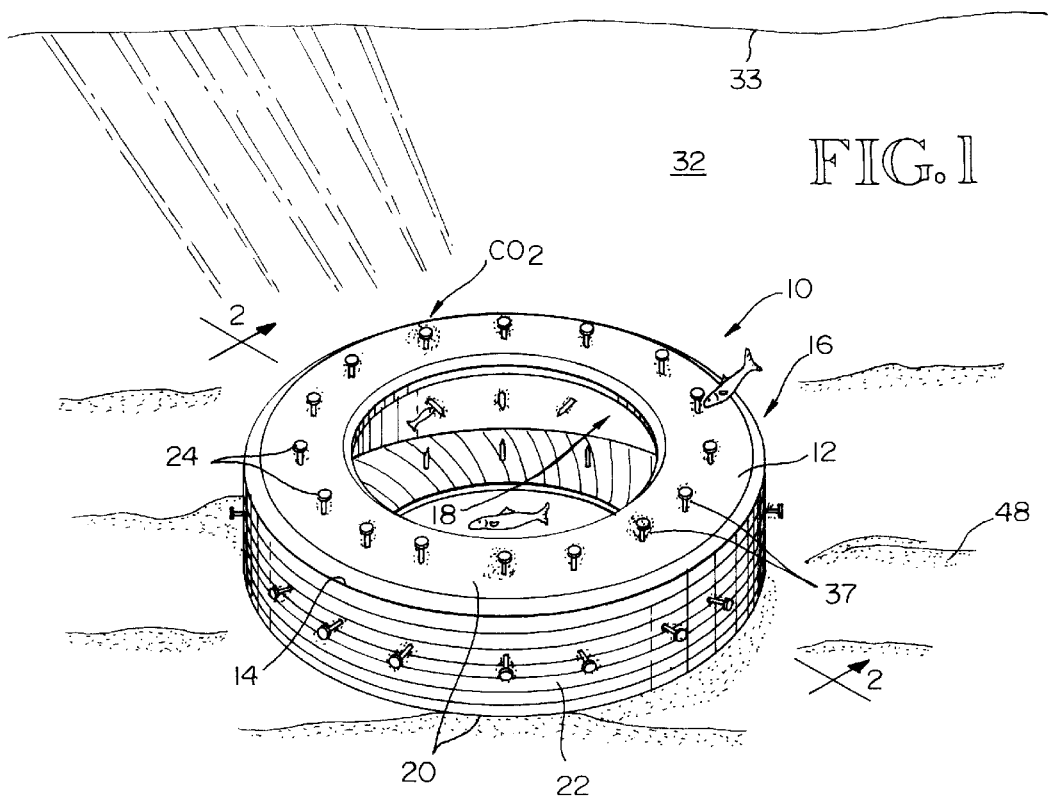
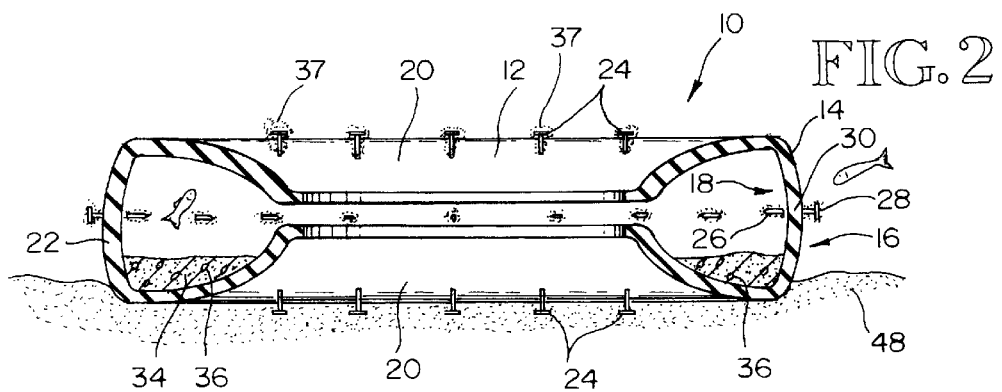
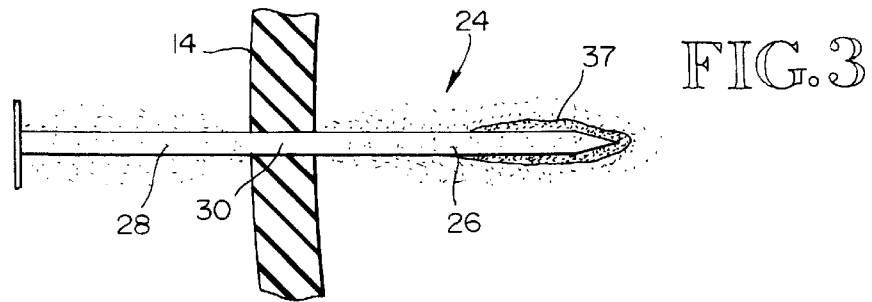

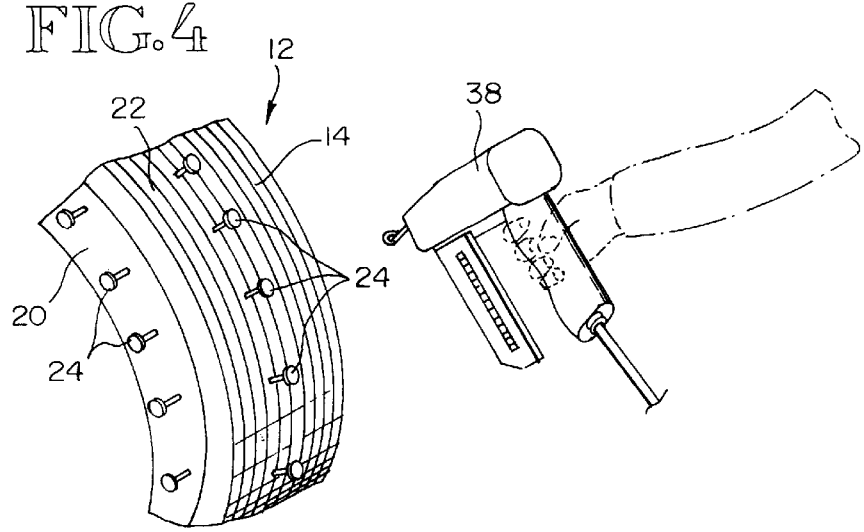
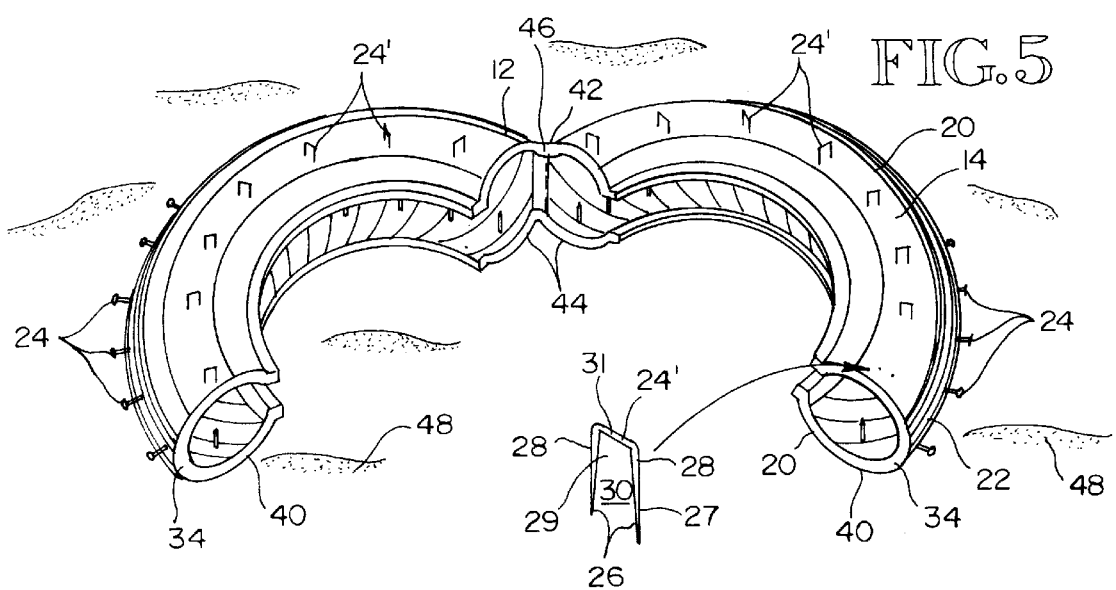
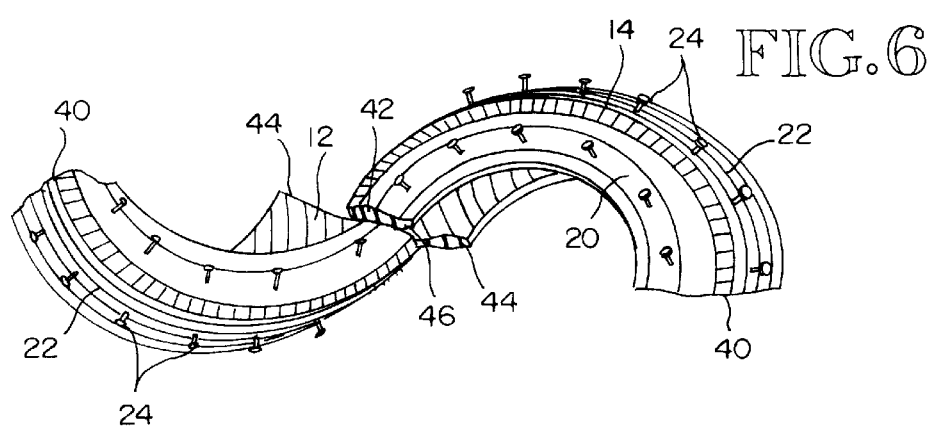

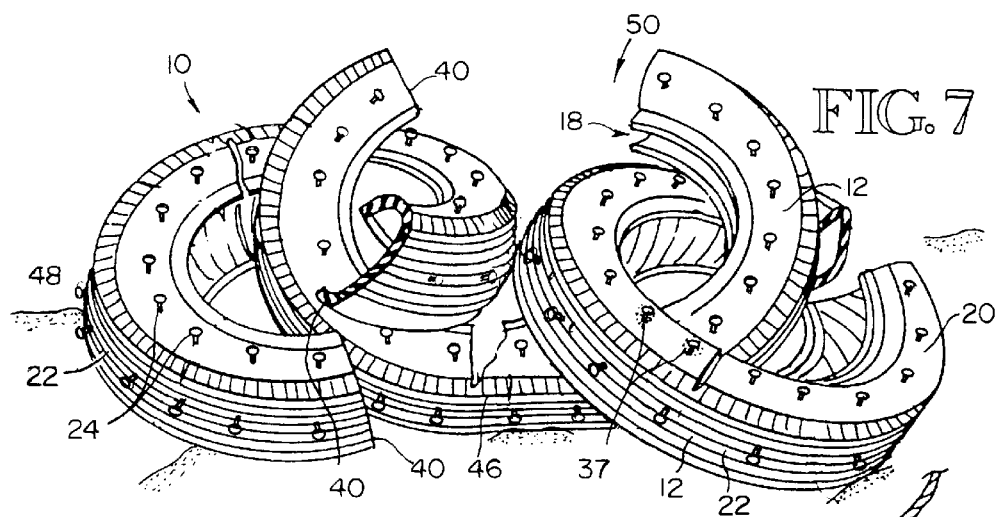
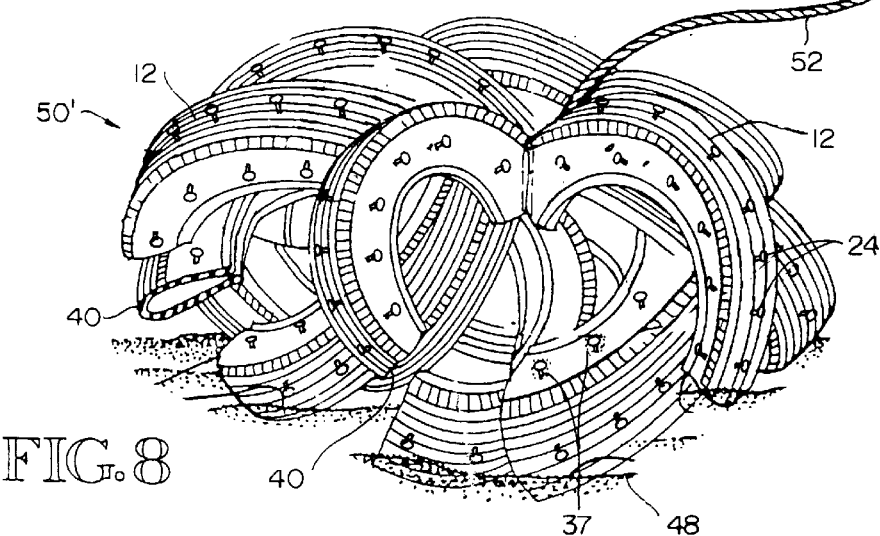
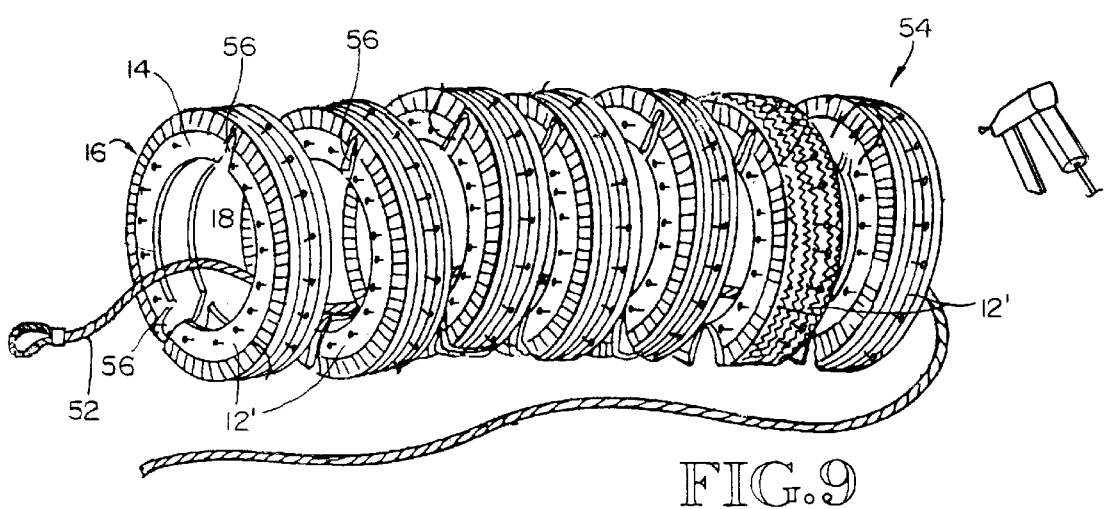

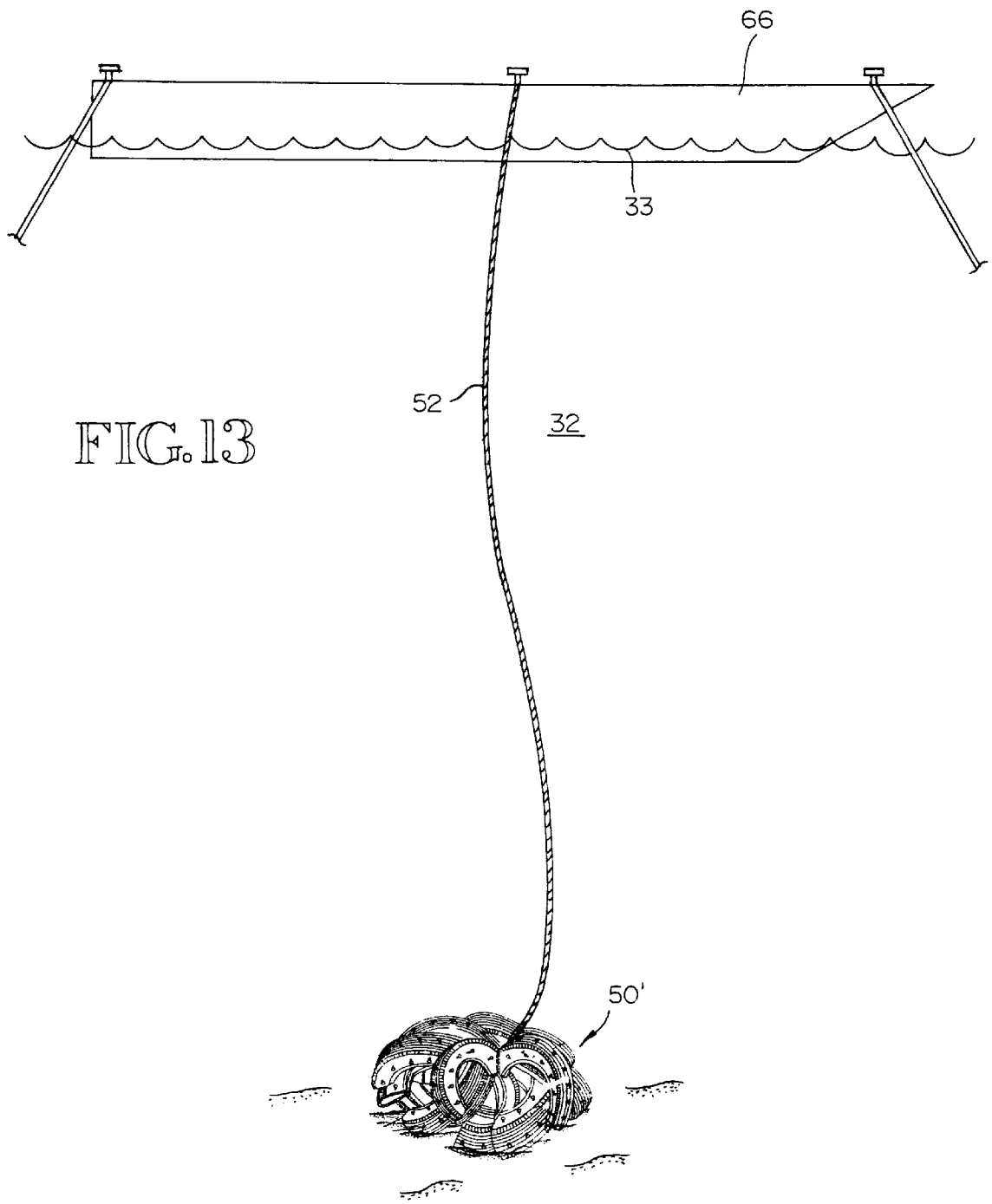

ARTIFICIAL REEF WITH CORRODIBLE IRON INSERTS

TECHNICAL FIELD

The present invention relates generally to an artificial reef that is not only a safe haven for aquatic life but is also capable of promoting rapid plant/plankton growth to sustain the aquatic life and, to absorb carbon dioxide, which an excess of carbon dioxide is believed to be a factor in ozone depletion. More particularly, the artificial reef of the present invention relates to a structure comprising at least one vehicle tire having a plurality of corrodible iron inserts inserted through the vehicle tire such that during corrosion of the inserts, plant/plankton growth is rapidly promoted by feeding on the dissolving iron and consuming carbon dioxide from the reef's surroundings. The iron enriched plankton provides food for the aquatic life.

BACKGROUND OF THE INVENTION

It has long been recognized by scientists worldwide that pollution, over-fishing, and over-use have put many of the world's coral reef habitats at great risk. Coral reefs, seaweed beds, and rocky areas are natural structures that encourage development of aquatic ecosystems and stability of beaches. Without such structures in oceans, lakes, and streams, the population of aquatic life tends to be at a minimum. The vitality of the world's coral reefs has been determined to be a serious priority of many of the world governments, as plentiful fish stocks are imperative for sustenance of much of the world's population.

Structures have been introduced into underwater areas to encourage the development of aquatic ecosystems. One such example has been described in my U.S. Pat. No. 5,238,325, granted Aug. 24, 1993, and entitled, "ARTIFICIAL REEF AND BEACH STABILIZER FORMED AN ASSEMBLAGE OF VEHICLE TIRES." My aforementioned patent discloses taking ordinary vehicle tires and creating an artificial reef to provide a safe haven for small fish (fry), as well as a stabilizer for eroding beaches. Vehicle tires are well suited for underwater applications because of their inherent inertness in such surroundings. Additionally, the use of vehicle tires in an underwater structure poses a potential solution for disposal as more traditional disposal for old vehicle tires, once worn out, have proven to be unsatisfactory.

Some scientists have theorized that many of the oceans are underproductive in a range of 15–20%, of which much may be attributed to low concentrations of iron within the water. There have been recent studies to support a proposition that fertilizing oceans with iron will help enrich fish stocks as it has been recently shown that iron has the capacity to rapidly generate phytoplankton, or plant plankton, which is needed to sustain aquatic life. One recent study has shown that the addition of iron to the ocean generated a 30 fold increase in phytoplankton. An added benefit of the rapidly increasing phytoplankton is that the tiny plant plankton use carbon dioxide as a building block. Thus, during the rapid growth, the phytoplankton pulls carbon dioxide out of its surroundings including the atmosphere. It is believed that a decrease in carbon dioxide may diminish the impact of global warming.

DISCLOSURE OF THE INVENTION

The present invention provides an artificial reef that is a safehaven for aquatic life and promoted further plankton growth, which is a food for the aquatic life. The reef includes at least one vehicle tire having a wall that defines an exterior and hollow interior. At least one elongated corrodible iron insert is inserted through the wall. Each said insert has a first end, a second end, and a center positioned between the two ends. The first end of each insert extends into the hollow interior, and the center is securely positioned through the wall between the exterior and the interior. The second end extends externally of the exterior. In use, the at least one tire is submerged under the surface of a seawater body. The iron inserts corrode to promote rapid phytoplankton growth. The hollow interior of each vehicle tire provides a safehaven for the aquatic life that feeds on the phytoplankton, and the phytoplankton consumes carbon dioxide from the reef's surroundings.

Once submerged, the first end of the insert will corrode at a different rate than the second insert, depending on the insert's position with respect to light. Both ends will corrode faster than the center, which is positioned through the wall, an inert material.

In one aspect of the invention, the inserts have varying percentages of iron content that corrode at a rate commensurate with each inserts particular iron content. Thus, a time-release corrosion effect is produced in order to promote phytoplankton growth over a period of time. The iron content percentages may range from a soft iron capable of quick corrosion when in contact with seawater, such an iron nail, to a steel alloy insert that will corrode slowly when in contact with seawater, such as a steel alloy nail.

The inserts may be of varying size and shape. Although a nail has been disclosed above, the insert may also be a staple having a first leg, a second leg, and an interconnecting top member. Here, the first leg and second leg both include first ends, second ends, and center portions. The first end of both legs is inserted through the wall to extend into the hollow interior. The second ends of both legs and the top member extend externally of the exterior. The center portions of both legs are securely positioned through the wall between the exterior and the interior.

The inserts may be inserted by a nail gun or a staple gun. A coated tapered nail of a size and shape to be received into a nail gun may be used as the inserts. During insertion, the nail gun strips the coating from the first end as the first end is inserted through the wall. When the reef is submerged under the seawater surface, the now uncoated first end corrodes first. The second coated end corrodes next, and the center will corrode last to effectively provide a time-released effect of iron corrosion within the body of the seawater to promote rapid phytoplankton growth over a period of time. In a preferred form, the number of inserts within each wall are evenly spaced along the wall ranging in a number from 2 to 60. Each insert may be coated with a coating to effect corrosion rates of the individual insert.

Various means may be employed to submerge the artificial reef under the seawater surface. One such means may be through a weight to anchor the reef in place under the seawater surface. Such weight may comprise a concrete disk that engages the wall through the hollow interior. Another such means may be a plurality of apertures through the tires sidewalls to counteract the inherent buoyance of the tire. The inserts themselves may also act as an anchor to weigh the reef to a bottom portion of the seawater body.

It is another aspect of the invention that at least one tire is radially severed through it's wall to provide opposite cut ends. Each radially severed tire is partially cut through between said cut ends to form tire sections connected together by an uncut portion. Each radially severed tire is oriented to position it's cut ends apart and directed to engage a bottom portion of the seawater body and resist movement of the tire along the bottom portion. In another form, an assemblage is formed from a plurality of the radially severed tires along with a connector for securing the plurality of tires together. The connector encircles the plurality of radially severed tires and connects the tires at each tire's uncut portion such that the cut ends of the tires are oriented apart from each other.

In yet another embodiment, the present invention includes a plurality of the radially severed tires described above that are interlinked into an assemblage of an expanded configuration beyond that of a single tire, and the plurality of the tires are operatively interrelated to maintain the cut ends apart from one another. The cut ends are then exposed to engage the bottom of the seawater body. In yet another form, the assemblage, just described, may also include a base member to which a plurality of radially severed tires are secured such that the cut ends are exposed in a spread apart position. The base member is also a vehicle tire having a wall defining an exterior and hollow interior, and the wall of the base member also including oppositely situated sidewalls that are interconnected by a treadwall to provide substantially U-shaped radial cross-section that defines a hollow interior of the base member. The oppositely situated sidewalls of the base member include a plurality of apertures of a size and number sufficient to counteract the inherent buoyance of the base member once submerged under the surface of the seawater.

In another embodiment of the invention, the artificial reef may be suspended from a floating or stationary structure within the seawater body to suspend the artificial reef and submerge it under the surface of the seawater body by a connector, such as rope or other fastener. The artificial reef may be weighted by the addition of other tires, by apertures, such as disclosed in the discussion of the base member above, cut ends such as the radially severed tires as discussed above, or in some other anchoring means such as a concrete disk.

In yet another embodiment of the present, an artificial reef that is locatable on the bottom of a body of water includes at least one vehicle tire having a wall defining an exterior and a hollow interior. The wall includes oppositely situated sidewalls that are innerconnected by a treadwall to provide a substantially U-shaped radial cross section defining the hollow interior. Each tire is radially severed through the wall to provide opposite cut ends, and each radially severed tire is partially cut through between the cut ends to form tire sections connected by an uncut portion. Each said tire is oriented to position its cut ends apart and directed to engage the bottom of the body of water and to resist movement of the tire along the bottom. Each said tire extends upwardly from the cut ends to form a sheltered zone bounded by the sidewalls and the treadwall of the tires. The tire also includes corrodible iron inserts in at least one of the sidewalls and treadwall at a boundary of the sheltered zone in a number sufficient to promote rapid phytoplankton growth and consumption of carbon dioxide from the reef's surroundings when the iron inserts are in contact with the water.

These and other advantages, objects and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the several views of the drawing, wherein:

FIG. 1 shows a tubular vehicle tire having a wall submerged under the surface of a seawater body and showing the tire having a plurality of corrodible iron inserts inserted through the wall with the inserts corroding at various rates to provide time-released promotion of phytoplankton growth;

FIG. 2 is a section view of FIG. 2 taken substantially along line 2—2 of FIG. 1 better disclosing a weight and the inserts anchoring the reef to a bottom portion of the seawater body;

FIG. 3 is an enlarged fragmentary view of one insert inserted through the wall, said insert shown having a first end, a second end, and a center all of which corrode at different rates;

FIG. 4 is a pictorial view of an insert being inserted by a nail gun into the wall in a select pattern;

FIG. 5 shows another embodiment of the present invention in which each tire is radially severed through its wall to provide opposite cut ends and also the tire being partially cut through between the cut ends to form tire sections connected together by an uncut portion and in which the cut ends provide a means to anchor each tire, and also disclosing a staple as the inserts on the upwardly facing sidewall;

FIG. 6 is a pictorial view of the tire shown like that of FIG. 5, which has been twisted about the uncut tread portion;

FIG. 7 shows an assemblage of the tires shown in FIGS. 5 and 6;

FIG. 8 shows another assemblage of the present invention disclosing another assemblage of severed tires of that shown in FIG. 5 and are assembled with a connector;

FIG. 9 is a pictorial view of another embodiment the present invention with radially severed tires and shown in the process of being assembled with a connector;

FIG. 13 is another embodiment of the present invention showing the assemblage of FIG. 8 suspended from a barge;

BEST MODE FOR CARRYING OUT THE INVENTION

Figure 10:
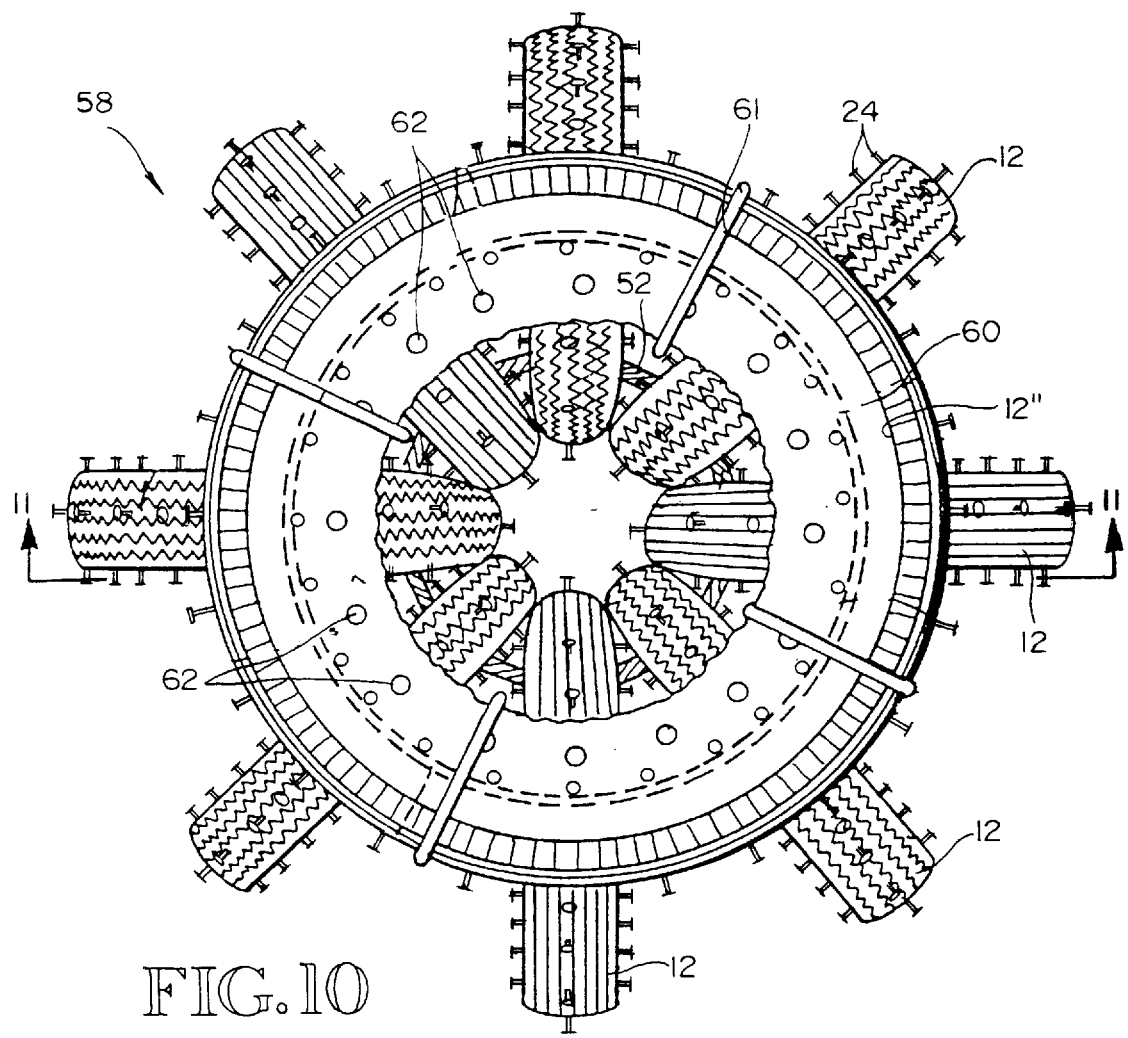
FIG. 10 is a top view of another embodiment of an assemblage of the tire shown in FIG. 5 including a base tire having a plurality of apertures, as opposed to being radially severed, and a connector.

The present invention provides a solution to three major ecological problems. First, the present invention directly provides a catalyst for the promotion of tiny plant plankton growth, also called phytoplankton or algae, in a protected structure for the small aquatic life that feeds off such phytoplankton in order to aid in repopulation of depleted fish stocks. Second, the present invention provides an opportunity to reuse an abundant, and otherwise disposable, material that would take up valuable space in our already over-loaded landfills. Last, the present invention addresses a way to absorb excess atmospheric carbon dioxide, of which has been attributed as a factor in the reduction in earth's ozone layer.

It has been commonly thought that many of the world's coastal reefs have been stripped of its necessary aquatic life due to pollution, over-use and, most importantly, over-fishing. This is especially true where many of the world's fish stocks have been depleted through dragline fishing. Many parts of the ocean have been stripped of necessary phytoplankton, which is a necessary food source to sustain the aquatic food chain. Phytoplankton provides food for zooplankton, or tiny animal plankton. In turn, zooplankton is food for small fish, or fry, which in turn is food for larger fish and marine life. The lack of larger fish and marine life can be a serious problem for our already over populated earth, which requires a substantial fish stock for sustenance.

Recent scientific studies have suggested that areas where the oceans are not producing much phytoplankton may be directly attributed to an iron deficiency within the water itself. Some scientists theorized iron shortages in 15 to 20% of the world's oceans. Iron "fertilization" of seawater has promoted rapid growth of phytoplankton in a range up to a 30 fold increase in a very short amount of time (a few days).

Additionally, during this rapid biological growth, there is an enhancement of flux of organic carbon from water surface concentration of inorganic carbon in surface water, and, in turn, lowers the atmospheric carbon dioxide concentration. As carbon dioxide reduction is consider a positive step to combat the harmful effects of global warming, it is thus believed that iron "fertilization" can be used to mitigate the harmful effects of global warming. Some reports have suggested that even minute amounts of iron added to iron deficient water can be used to stimulate plant production and intake carbon dioxide.

Referring to FIGS. 1 and 2, the present invention is an artificial reef 10 made from at least one tubular vehicle tire 12. The selection of a used vehicle tire as the basic building block of the reef is beneficial as tires are inherently inert in seawater and used vehicle tires are inexpensive and abundant. Moreover, utilizing used vehicle tires in the present invention mitigates an otherwise problematic disposal problem: that is to minimize the number of vehicle tires being sent to over-loaded landfills.

Each tire 12 includes a wall 14 that defines an exterior 16 and a hollow interior 18. Each wall 14 is comprised of oppositely situated sidewalls 20 that are interconnected with a treadwall 22 to form a substantially U-shaped radial cross-section 23 that defines hollow interior 18.

Referring also FIG. 3, tire 12 includes at least one iron insert 24, which is inserted through each wall 14. Each insert 24 includes a first end 26, a second end 28, and a center 30. The first end 26 of each insert 24 is positioned to extend into the hollow interior 18, and the second end 28 extends externally of the exterior 16. The center 30 is securely positioned through the wall 14 between the exterior 16 and hollow interior 18, such that the insert is not easily dislodged. Each insert may be inserted through any portion of the wall, such as the sidewalls or treadwall. In preferred form, each tire includes anywhere from 2 to 60 inserts. Each insert 24 contains some iron content that inherently corrodes when exposed to moist air or water.

In use, reef 10 is submerged within a body of seawater 32 underneath the seawater's surface 33. However, for the reef to remain submerged, each tire must include a weighting means 34 to overcome the inherent buoyancy of its tubular shape. Many such weighted means are disclosed below. FIGS. 1 and 2 disclose one such weighting means, a weight or anchor 36, such as a concrete disk, that is inserted within the hollow interior and overlapping the U-shaped wall to counteract the buoyancy of the tire. Thus, the weight keeps reef 10 submerged at all times to expose the inserts to seawater and provide a protected area (the hollow interior) for small fry. The inserts 24 may also aid in anchoring the reef to a bottom portion 48 of the seawater body 32.

Once the reef is submerged, the iron in the inserts begin to corrode, thus, creating dissolved iron. Small plant plankton will feed on the dissolved iron and produce rapid phytoplankton 37, thereby attracting small aquatic life that feeds on such phytoplankton. The hollow interior defined by the U-shaped wall provides the much needed protection for the small fry as it feeds on the phytoplankton. Additionally, the phytoplankton consumes carbon dioxide ($CO_2$) from its surroundings. As discussed above, this absorption of $CO_2$ from the atmosphere may mitigate the harmful effects of global warming.

Although the amount of salt concentration in the water, as well as the amount of light, will affect corrosion rates, the first end 26 will corrode at a different rate from that of the second end 28 because the first end 26 is shielded by the confines of the hollow interior 18. The exterior or interior will be more or less exposed to light than the other, affecting which end corrodes first. The center 30, which is positioned through the wall 14 whether it be the treadwall 22 or one of the sidewalls 20, will naturally corrode later than that of the first or second end as the center is encased in an inert material.

According to another aspect of the present invention, the inserts 24 have varying iron contents. For example, a first insert could be a soft iron nail that is easily corrodible in seawater. At the other end of the spectrum, another insert could be a harder and less corrosive steel alloy, such as a steel alloy nail. Thus, once the reef is submerged, the steel alloy nail will corrode at a slower rate than the soft iron nail. Other inserts 24 would be of various iron alloy compositions to corrode faster than a steel alloy nail but slower than that of a soft iron nail. As shown in FIG. 1, a pattern of inserts of various corrosivity are inserted within wall 14 to effectively time-release insert corrosion over a period to time. In this manner, rapid promotion of phytoplankton can be controlled given the particular ocean environment in which the reef is to be submerged.

Inserts 24 may be of a variety of shapes and sizes. As discussed above, a nail may be one such insert. Another such insert could be a staple 24' such as shown in FIG. 5, having a first leg 27, a second leg 29, and a top member 31 interconnecting the first leg and second leg. Both legs 27, 29 include the first end 26, second end 28, and center 30. In this manner, top member 31 is adjacent exterior 16 and divers or installers are less likely to be injured or become snagged on such insert when in close contact with the reef.

Referring to FIG. 4, the preferred method to insert inserts 24 through wall 14 is through a standard commercial nail gun shown at "38". Typically, a nail gun accepts coated nails having a long tapered end (first end 26). During the nail gun process, the coating is stripped off the first end as the nail is inserted through the wall. Thus, the now uncoated first end will corrode at a faster rate than the second end, which is still coated, as the coating will inhibit corrosion for a measurable amount of time. A staple gun (not shown) would also be a preferred method of installing inserts 24' through wall 14. The inserts may also be installed all at once by a nail gun machine.

According to another aspect of the invention, each insert may be coated to affect its corrosion rate.

In one embodiment of the present invention, the structure of reef 10 may be like that disclosed in my aforementioned U.S. Pat. No. 5,238,325, and is incorporated by reference herein. Referring to FIG. 5, that aspect encompasses severing each vehicle tire 12 through it's wall 14 to provide opposite cut ends 40. Between the cut ends (at a point designated at 42), the tire is then partially cut, shown at 44, to form tire sections connected together by an uncut portion 46. In this embodiment, the weighting means 34 is the cut ends, such that when spread apart and directed to engage the bottom 48 of the body of seawater 32, the reef 10 is effectively weighted to resist movement along the bottom 48.

FIG. 6 shows the embodiment of FIG. 5 in a twisted matter that can be incorporated with the tire of FIG. 5 to form an assemblage 50 such as that shown in FIG. 7 to engage the bottom of the seawater 48. In this assemblage, hollow interior 18 may be upwardly directed; thus, light might be visible to some of the first ends of inserts 24 within the assemblage. Thus, the corrosion rate of the first end 26 of insert 24 and the second end 28 might change in relation to each other depending on the insert's position within the assemblage. The position of the assemblage shown in FIG. 7 allows each cut end 40 to act as a weight, or anchor, to submerge the assemblage below seawater surface 33.

Referring to FIG. 8, another assemblage embodiment 50' of the severed tire of FIGS. 5 and/or 6 can be assembled with a common connector shown at 52. In this manner, the assemblage may be suspended from any fixed or floating structure, such as a dock 64 or piling (FIG. 12), an oil rig (not shown), a buoy (not shown), or a barge 66 (FIG. 13), that would provide a relatively secure structure above or atop the seawater surface 33 in which to suspend the assemblage 50, 50' from connector 52. Thus, here, the weighting means 34 is the cut ends of the tires in conjunction with the mass of the tires suspended from the common connector.

The shape of the embodiment of the assemblage 50' (FIG. 8) provides an additional benefit as phytoplankton 37 is formed on the inserts positioned off the bottom 48 of seawater body 32. Thus, fish are not feeding directly off the bottom 48. This can be a benefit in highly polluted waterways where it is undesirable to have the fish feed off a contaminated bottom portion of a polluted waterway. The embodiments shown in FIGS. 8–13, discussed below, also provide this benefit.

FIG. 9 discloses another assemblage 54 of the present invention comprising severed tires 12' of a vehicle tire having radially partially severed cuts 56. A connector 52, similar to that shown in FIG. 8, is used to connect all the tires 56 to form the assemblage and to suspend the assemblage 54 from a structure discussed above, beneath the surface of the seawater body.

Figure 11:
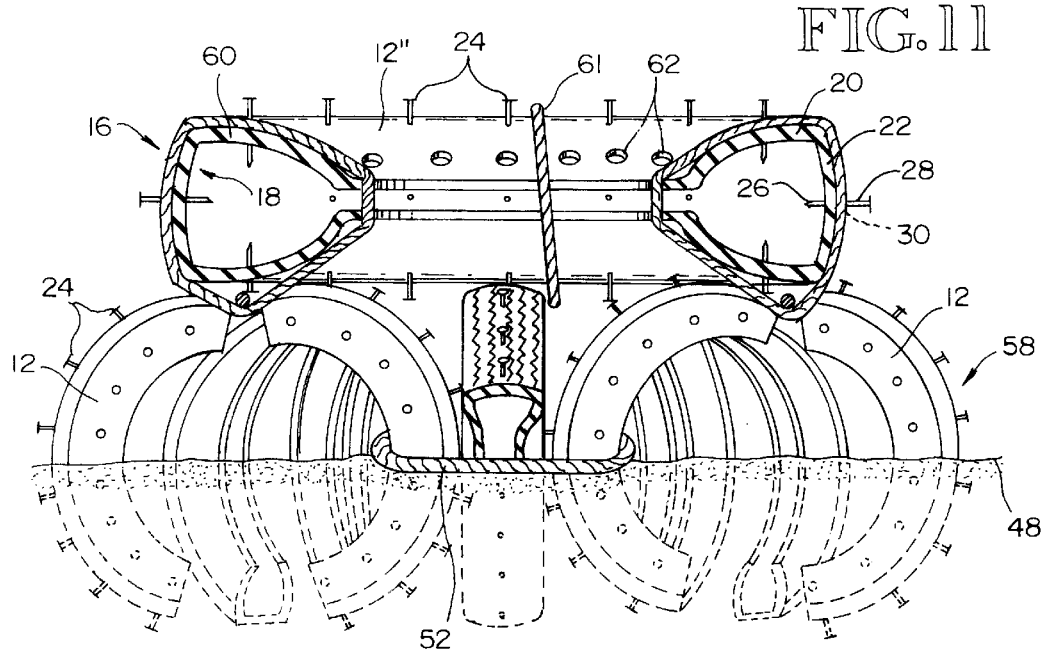
FIG. 11 is a section view of the assemblage of that of FIG. 10 taken substantially along line 11—11 of FIG. 10.

According to another aspect of the present invention, an alternate assemblage embodiment 58 is disclosed in FIGS. 10 and 11 in which a plurality of severed tires, like that shown in FIG. 5, are connected by a connector 52, to form a outwardly extending radial ring having a base member 60. Another vehicle tire 12", like that disclosed in FIG. 1 and denoted at "12", is base member 60 to assemblage 58. Base member 60 is connected to assemblage 58 by non-corrosive connectors 61, whether fasteners or ropes, and acts as a weight upon the assemblage. Base member 60 contains a plurality of apertures 62 through the oppositely situated sidewalls 20 of wall 14 to counteract the buoyancy of base tire 60. Each non-base tire is pulled apart at the cut ends 40 in order to engage bottom 48, and is, therefore, already weighted.

The assemblage shown in FIGS. 10 and 11, as well as FIGS. 7 and 8, can also be used as a beach stabilizer, like that disclosed in my aforementioned patent, to aid in stopping beach erosion. When several of these reefs are banked together and are installed near a beach that is eroding, the waves will break early over the reef bank. Over time, sand will build up over the reef bank and provide an early breaking structure to aid in protecting valuable beach/shoreline near homes and businesses.

Additionally, the inserts may also act to anchor the reef to the bottom of the seawater, as discussed above, sand may fill up the interior and keep the reef anchored as a beach stabilizer (such as shown in FIG. 2) or to keep the tire from sliding into deep water. Deep water (over 70 feet) would impart little light to a reef located at the bottom of such water. Thus, there would be reduced benefit in that less phytoplankton would grow here.

Another such use of such reefs may be to create aquatic reefs or rejuvenate existing coral reefs at resorts where diving and snorkeling are favorite pastimes.

Figure 12:
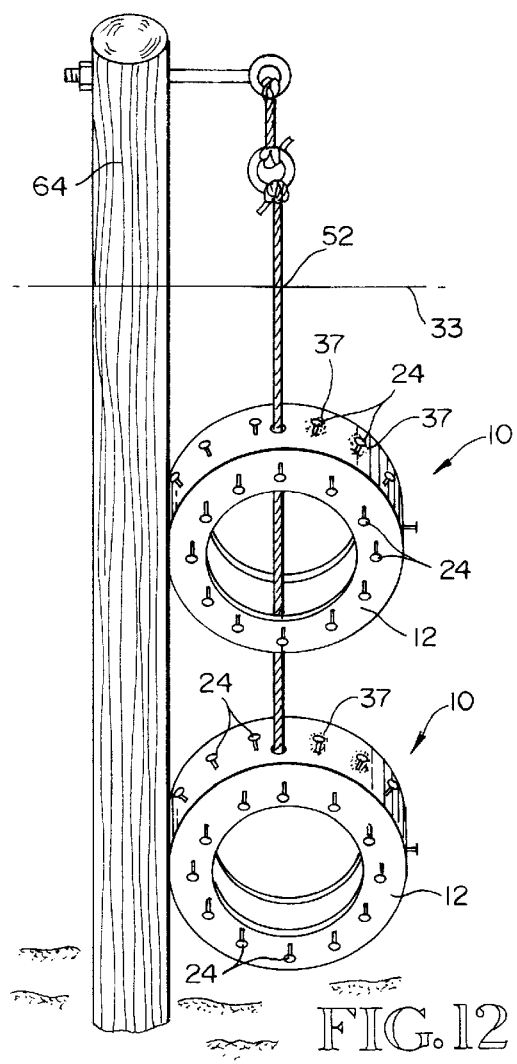
FIG. 12 is a pictorial view of another embodiment of the present invention disclosing shown with at least one tire submerged underneath the surface of the seawater body and suspended from a stationary structure.

Another embodiment of the present invention is disclosed in FIG. 12. FIG. 12 discloses at least one vehicle tire 12 (two are shown for clarity) having a plurality of apertures 62, similar to base member 60 discussed above. Tire 12 is suspended from a stationary or floating structure by a connector 52, similar to that disclosed above, to submerge reef 10 under the seawater surface 33. FIG. 12 discloses spaced apart tires.

Figure 14:
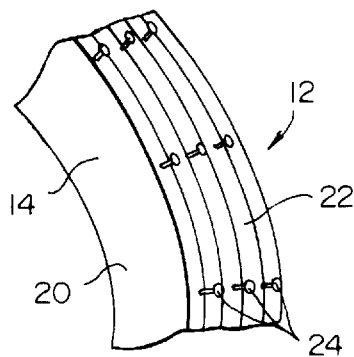
FIG. 14 is a pictorial view of a tire showing the inserts in a row pattern.
Figure 15:
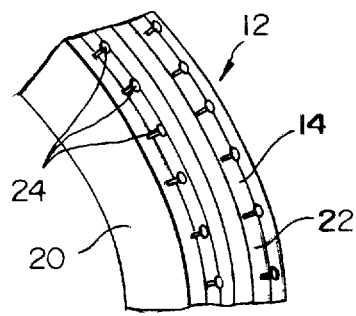
FIG. 15 is a view like that of FIG. 14 except showing the inserts in a column pattern.

In another aspect of the present invention, the inserts may be in a particular pattern on the wall of the tire. The pattern may be that of a row shown in FIG. 14, or a column shown in FIG. 15 or some combination thereof (FIG. 4).

Thus, it can easily be seen that the materials for the artificial reef of the present invention incorporates standard inexpensive materials that can be assembled in an inexpensive and simple manner to obtain a stabilizing or rejuvenating solution to several ecological problems.

The illustrated embodiments are only examples of the present invention and, therefore, are non-limitive. It is to be understood than many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. An artificial reef comprising:

at least one vehicle tire having a wall defining an exterior and a hollow interior; and at least one spaced apart elongated corrodible iron insert inserted through the wall, each said insert having a first end, a second end, and a center positioned between the two ends, wherein the first end of each insert extends into the hollow interior, the center is securely positioned through the wall between the exterior and the interior, and the second end extends externally of the exterior;

wherein, in use, the at least one tire is submerged under the surface of a seawater body; and wherein said at least one iron insert corrodes to promote rapid phytoplankton growth, wherein the hollow interior of each said vehicle tire provides a safe haven for aquatic life that feeds on the phytoplankton, and the phytoplankton consumes carbon dioxide from the reef's surroundings.

2. The artificial reef according to claim 1, wherein each said insert has varying percentages of iron content that corrode at a rate commensurate with each said insert's particular iron content to produce a time-released corrosion in order to promote phytoplankton growth over a period of time.

3. The artificial reef according to claim 2, wherein at least one of said at least one insert is made from soft iron capable of quick corrosion when in contact with seawater.

4. The artificial reef according to claim 2, wherein at least one of said at least one insert is made from a steel alloy in order to corrode slowly when in contact with seawater.

5. The artificial reef according to claim 1, wherein the first end of each said insert corrodes at a different rate than that of the second end, and both the first and second ends will corrode faster than the center.

6. The artificial reef according to claim 1, wherein each said insert is a coated tapered nail of a size and shape to be received into a nail gun, each said insert is inserted through its corresponding wall by the nail gun, during insertion, the nail gun strips the coating from the first end as the insert is forced through the wall;
whereby the now uncoated first end corrodes first, the second coated end corrodes next, and the center will corrode last to effectively provide a time-released effect of iron corrosion within the body of the seawater to promote rapid phytoplankton growth over a period of time.

7. The artificial reef according to claim 1, wherein said at least one insert is evenly spaced along the wall ranging in number of from two to sixty.

8. The artificial reef according to claim 1, further comprising a weight to anchor the reef in place under the seawater surface.

9. The artificial reef according to claim 8, wherein the weight further comprises a concrete disk that engages the wall through the hollow interior.

10. The artificial reef according to claim 1, the wall comprises oppositely situated sidewalls that are interconnected by a treadwall to provide a substantially U-shaped radial cross-section defining the hollow interior, and further comprising a plurality of apertures within the oppositely situated sidewalls of a size and number sufficient to counteract the inherent buoyancy of the tire when submerged under the surface of the seawater body.

11. The artificial reef according to claim 1, wherein the at least one tire is radially severed through its wall to provide opposite cut ends, and said at least one tire is partially cut through between said cut ends to form tire sections connected together by an uncut portion.

12. The artificial reef according to claim 11, wherein each radially severed tire is orientated to position its cut ends apart and directed to engage a bottom portion of the body of the seawater and resist movement of the tire along the bottom portion.

13. The artificial reef according to claim 11, further comprising an assemblage of a plurality of the radially severed tires along with a connector for securing the plurality of tires together, wherein said connector encircles the plurality of radially severed tires and connects the tires at each tire's uncut portion such that the cut ends of the tires are oriented apart from each other.

14. The artificial reef according to claim 11, further comprising a plurality of said radially severed tires interlinked into a assemblage of an expanded configuration beyond that of a single tire and such that the plurality of such tires are operatively interrelated to maintain the cut ends apart from one another and exposed to engage a bottom of the seawater body.

15. The artificial reef according to claim 14, further comprising a base member to which a plurality of said radially severed tires are secured such that the cut ends of the tires are exposed in a spread apart position, said base member being a vehicle tire having a wall defining an exterior and a hollow interior, said wall of the base member having oppositely situated sidewalls that are interconnected by a treadwall to provide a substantially U-shaped radial cross-section defining the hollow interior of the base member and said oppositely situated sidewalls of the base member including a plurality of apertures of a size and number sufficient to counteract the inherent buoyancy of the base member when submerged under the surface of the seawater body.

16. The artificial reef according to claim 1, wherein the at least one tire is suspended from a floating structure by a connector and wherein the at least one tire is submerged under the surface of the seawater body.

17. The artificial reef according to claim 16, the wall further comprising oppositely situated sidewalls that are interconnected by a treadwall to provide a substantially U-shaped radial cross-section defining the hollow interior, and said sidewalls including a plurality of apertures of a size and number sufficient to counteract the inherent buoyancy of the tire when submerged under the surface of the seawater body.

18. The artificial reef according to claim 1, wherein the at least one tire is suspended from a stationary structure within the seawater body by a connector, and wherein the at least one tire is submerged under the surface of the seawater body.

19. The artificial reef according to claim 18, the wall comprising oppositely situated sidewalls that are interconnected by a treadwall to provide a substantially U-shaped radial cross-section defining the hollow interior, and said sidewalls including a plurality of apertures of a size and number sufficient to counteract the inherent buoyancy of the tire when submerged under the surface of the seawater body.

20. The artificial reef according to claim 1, wherein at least one insert comprises a staple having a first leg and a second leg and an interconnecting top member, both the first leg and second leg include first ends, second ends, and center portions in which the first end of both legs is inserted through the wall to extend into the hollow interior, the second ends of both legs, and the top member extends externally of the exterior, and the center portions of both legs are securely positioned through the wall between the exterior and the interior.

21. The artificial reef according to claim 1, wherein each said insert comprises a nail.

22. The artificial reef according to claim 1, wherein each said insert is coated with a coating to affect the corrosion rate of each said insert.

23. The artificial reef according to claim 1, wherein the at least one insert is used to anchor the at least one tire to a bottom portion of the body of the seawater.

24. An artificial reef locatable on the bottom of a body of water, comprising:
at least one vehicle tire, said at least one tire including a wall defining an exterior and a hollow interior, said wall having oppositely situated sidewalls that are interconnected by a treadwall to provide a substantially U-shaped radial cross-section defining the hollow interior;
said at least one tire being radially severed through the wall to provide opposite cut ends, and said at least one tire being partially cut through between said cut ends to form tire sections connected by an uncut portion;
said at least one tire being oriented to position its cut ends apart and directed to engage the bottom and resist movement of said at least one tire along the bottom;

said at least one tire extending upwardly from the cut ends to form a sheltered zone bounded by the sidewalls and the treadwall of the tires; and a plurality of corrodible iron inserts in at least one wall of said at least one tire to promote rapid phytoplankton growth and consumption of carbon dioxide from the reef's surroundings when the iron inserts are in contact with the water.

* * * * *